United States Patent [19]

Naylor

[11] 4,360,643
[45] Nov. 23, 1982

[54] METHOD OF PREPARING LACTONE BLOCK COPOLYMERS

[75] Inventor: Floyd E. Naylor, Bartlesville, Okla.

[73] Assignee: Phillips Petroleum Company, Bartlesville, Okla.

[21] Appl. No.: 169,346

[22] Filed: Jul. 16, 1980

Related U.S. Application Data

[63] Continuation of Ser. No. 27,124, Apr. 4, 1979, abandoned.

[51] Int. Cl.$^3$ ................................................ C08F 6/02
[52] U.S. Cl. .................................................... 525/386
[58] Field of Search ........................................ 525/386

[56] References Cited

U.S. PATENT DOCUMENTS

| | | | |
|---|---|---|---|
| 3,021,309 | 2/1962 | Cox | 260/78.3 |
| 3,177,190 | 4/1965 | Hsieh | 260/94.2 |
| 3,557,255 | 1/1971 | Sharkey | 260/879 |
| 3,585,257 | 6/1971 | Mueller | 260/880 |
| 3,598,799 | 8/1971 | Naylor | 260/879 |
| 3,627,745 | 12/1971 | Hsieh | 260/94.7 |
| 3,639,519 | 2/1972 | Hsieh | 260/880 |
| 3,640,990 | 2/1972 | Naylor | 260/94.7 |
| 3,652,720 | 3/1972 | Wright | 260/876 B |
| 3,654,212 | 4/1972 | Wright | 525/386 |
| 3,880,955 | 4/1975 | Hsieh | 260/887 |

OTHER PUBLICATIONS

Hsieh, J. Applied Polymer Science, vol. 22, pp. 1119–1127, 1978.
Ito, Macromolecules, vol. 10, pp. 821–824, 1977.
Ito, Macromolecules, vol. 11, pp. 68–75, 1978.
Allport, Block Copolymers, John Wiley, New York, pp. 76–81, 1973.

*Primary Examiner*—Paul R. Michl

[57] ABSTRACT

A method is provided for producing block copolymers of a lactone and a conjugated diene and/or a monovinylarene, in which the lactone polymerization step is terminated by addition of water, a mineral acid or a carboxylic acid.

14 Claims, No Drawings

METHOD OF PREPARING LACTONE BLOCK COPOLYMERS

This application is a continuation of copending application Ser. No. 27,124, filed Apr. 4, 1979, now abandoned.

BACKGROUND OF THE INVENTION

1. Field of the Invention

This invention relates to a process for the preparation of copolymers of a lactone and a conjugated diene and/or a monovinylarene. In another aspect, the invention relates to a process for preparing a copolymer of a lactone and a conjugated diene and, optionally, a monovinylarene having good compatibility with unsaturated polyester resins. In a further aspect, the invention relates to termination of polymerization reactions.

2. Description of the Prior Art

It is known that copolymers of conjugated dienes and monovinylarenes are useful modifiers for unsaturated polyesters. However, the conjugated diene/monovinylarene polymer/polyester compositions are not stable and are subject to the problem of separation of components and consequent loss of the properties imparted by the conjugated diene-monovinylarene polymer. As disclosed in a copending application, the present inventor, Raymond F. Uber, and Clifford W. Childers have found that block copolymers of a lactone and a conjugated diene and, optionally, a monovinylarene impart the desired modifications to an unsaturated polyester and minimize the problem of phase separation. However, not all of the methods for preparing such block copolymers suggested in the prior art consistently produce copolymers which have maximum compatibility with the polyester and therefore maximum effectiveness. It is believed that conventional techniques of polymerization termination applied to lactone copolymer preparation can degrade the polymer produced so as to make it an unstable modifier of unsaturated polyesters.

OBJECTS OF THE INVENTION

It is thus an object of this invention to provide an improved method of preparing copolymers of a lactone and a conjugated diene and/or a monovinylarene.

It is a further object of the invention to provide a method of preparing conjugated diene-lactone copolymers which are effective, stable modifiers of unsaturated polymers.

SUMMARY OF THE INVENTION

In accordance with the invention, in the preparation of block copolymers of a lactone and a conjugated diene and/or a monovinylarene using an organolithium initiator, the final polymerization step is terminated by use of water, an aqueous solution of a mineral acid, or a carboxylic acid.

DETAILED DESCRIPTION OF THE INVENTION

The lactone coplymers which are prepared according to the process of the invention are block copolymers of lactones and conjugated dienes; lactones and monovinylarenes; and lactones, conjugated dienes and monovinylarenes. Lithium-based compounds are used as polymerization initiators.

The lactone copolymers of the invention can be represented by the formula $A$—$(D)_y$ where A and D are polymer segments and y is an integer from 1 to 4. A can be linear or branched and normally will contain a residue of the polymerization initiator. When a monolithium integer is used, the lactone copolymers can be represented at least in part by the formula A—D, where A is a polymer segment comprising one or more polymer blocks (including homopolymer, randon, and random-tapered blocks) of one or more conjugated dienes and/or one or more monovinylarenes, and D is a polymer segment comprising one or more polymer blocks of one or more lactones. When the A segment contains both conjugated dienes and monovinylarenes, the conjugated diene to monovinylarene weight ratio can range from about 99:1 to about 1:99.

Following the formation of the A segment, the lactone or mixture of lactones can be added directly to the polymerization mixture containing the preformed living polymer of the form A—Li or, preferably, the lactone or mixture of lactones can be added after the living polymer is reacted with a capping agent such as an oxirane, aldehyde, epoxyaldehyde, polyaldehyde, ketone, or epoxyketone, as described in U.S. Pat. No. 3,585,257 and U.S. Pat. No. 3,639,519, the disclosures of which are hereby incorporated by reference. The resulting polymer will contain a residue of the capping agent used. Because of its availability and lack of coupling activity with the living polymer, propylene oxide is the preferred capping agent for this invention.

It is essential that the A segment be polymerized first because the polymer-Li structure, or the polymer-O—Li structure of the capped or coupled A segment, is believed to serve as the initiator for the polymerization of the lactone monomer. If the lactone monomer is polymerized first, the lactone polymer-O—Li structure does not provide a reactive site for the subsequent polymerization of the conjugated diene or the monovinylarene, and the block copolymer cannot be formed.

The process for preparation of the lactone block copolymers can also be a multi-step process in which a conjugated diene or a monovinylarene or mixture is polymerized to essentially quantitative conversion using the lithium-containing initiator. Each succeeding step can then involve the addition of a different conjugated diene or monovinylarene or mixture which is polymerized to essentially quantitative conversion so that a block copolymer having two or more blocks is formed before the lactone is added. The addition and polymerization of a lactone, mixture is lactones, or successive increments of different lactones are the final steps in the multi-step polymerization process. It is essential in this process also that the conjugated dienes and monovinylarenes be polymerized first for the reason discussed above.

It is currently believed that, when y is 1, if the capping agent used can be a coupling agent for the preformed A—Li polymer, as is the case, for example, for a compound having two or more oxirane groups, a polyaldehyde or an epoxyketone, or if no capping agent is added before the lactone (which itself can act as a coupling agent) is added to the preformed, non-capped living polymer, there may result after termination a polymer having the formula $(A)_n Z(H)_n$, in which A is as described previously, Z is the residue from one molecule of the capping-coupling agent or one molecule of the lactone monomer, and n is an integer having a maximum value equal to the number of living polymer segments A which can combine with the lactone monomer or the chosen capping-coupling agent. When Z is derived from the lactone monomer, n will have a maximum value of 2.

The precursor of the coupled product $(A)_nZ(H)_n$ prior to termination of the polymerization reaction has the general structure $(A)_nZ(Li)_n$ and can initiate the polymerization of lactone monomer to give a branched polymer having up to n polylactone branches. After termination of the polymerization reaction, this branched polymer can be represented by the formula $(A)_nZ(D)_m(H)_{n-m}$, where D is a block polylactone as described previously and m is an integer from 1 to and including n. There is also the possibility that a small amount of lactone homopolymer may be formed during polymerization as a result of base-catalyzed chain scission. Thus, the polymerized lactone composition may consist of one or more polymers of the structures A—D, $(A)_nZ(H)_n$, $(A)_nZ(D)_m(H)_{n-m}$, and D.

As used in this application, the formula $A\text{-}(D)_y$ is intended to encompass copolymers in which some coupling of the type described above has taken place.

The copolymers of a lactone and a conjugated diene and/or a monovinylarene which can be prepared according to the process of the invention are predominantly of the structure A—D when a monolithium initiator is used. They are prepared using a recipe in which the lactone or mixture of lactones constitutes about 4 to 90 weight percent of the total monomers, preferably about 8 to 50 weight percent, in order to provide a lactone polymer with god compatibility with an unsaturated polyester resin. It is estimated that, using the preferred recipe, the weight percent polymerized lactone in the block copolymer will range from about 2 to about 40 weight percent of the total polymerized monomers. When the A segment of the copolymer comprises a copolymer of conjugated dienes and monovinylarenes, the conjugated diene to monovinylarene weight ratio preferably ranges from about 99:1 to about 50:50. The molecular weight of the lactone copolymers of the invention, calculated on the basis of millimoles of initiator per 100 g of total charge, will be broadly from 5,000 to about 1,000,000, generally about 35,000 to 150,000.

Conjugated dienes containing 4 to about 12 carbon atoms per molecule and monovinylarenes containing 8 to about 12 carbon atoms per molecule can be used for the polymerized lactone compositions prepared according to the process of this invention. For example, suitable conjugated dienes include 1,3-butadiene, isoprene, piperylene, 6-phenyl-1,3-hexadiene, and mixtures of these. Examples of suitable monovinylarenes include styrene, α-methyl-styrene, 4-methylstyrene, 4-isopropylstyrene, 2,4-dimethylstyrene, 1-vinylnaphthalene, 2-vinylnaphthalene, and mixtures of these.

Lactone monomers which can be employed in the process of this invention can be represented by the formula

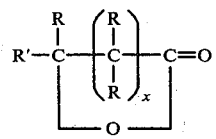

in which each R is selected independently from hydrogen, alkyl, cycloalkyl, alkenyl, cycloalkenyl, and aryl, and combinations thereof such as alkaryl and aralkyl; R' is selected from R, hydrogen and a radical of formula

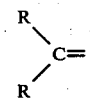

and, when R' is the specified radical, no R is attached to the carbon atom to which the radical is attached; the total number of carbn atoms in all the R and R' substituents is within the range 0 to about 12; and x is 1, 3 or 4. Examples of lactones which can be used include beta-propiolactone, delta-valerolactone, epsilon-caprolactone, and lactones corresponding to the following acids: 2-methyl-3-hydroxypropionic acid, 3-hydroxynonanoic acid, 2-dodecyl-3-hydroxypropionic acid, 2-cyclopentyl-3-hydroxypropionic acid, 3-phenyl-3-hydroxypropionic acid, 2-(1-naphthyl)3-hydroxypropionic acid, 2-butyl-3-cyclohexyl-3-hydroxypropionic acid, 3-hydroxypentadecanoic acid, 2-(2-methylcyclopentyl)-3-hydroxypropionic acid, 2-o-tolyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-(2-cyclohexylethyl)-5-hydroxy-valeric acid, 2-(2-phenylethyl)-4-propyl-5-hydroxyvaleric acid, 4-benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, 2,2,4-trimethyl-3-hydroxy-3-pentenoic acid, 2-phenyl-6-hydroxy-6-octenoic acid, and 2,2-dipropenyl-5-hydroxy-5-heptenoic acid. Mixtures of lactones can be employed.

The initiator used can be any lithium-containing polymerization initiator suitable for use with conjugated dienes and/or monovinylarenes. The preferred initiators are those which correspond to the general formula $R''(Li)_y$, in which $R''$ is a hydrocarbon radical selected from the group consisting of aliphatic, cycloaliphatic, and aromatic radicals and combinations thereof, and y is an integer from 1 to 4, inclusive. The $R''$ group has a valence equal to y and preferably contains from 1 to about 20 carbon atoms, although it is possible to use high molecular weight compounds. Examples of suitable lithium-containing compounds within the scope of the above formula include methyllithium, isopropyllithium, n-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithioanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, and 1,2,3,5-tetralithio-4-hexylanthracene. Other suitable initiators include reaction products between the compounds of the formula $R''(Li)_y$ as disclosed above and one of a divinylaromatic or a trivinylaromatic compound containing 1 or 2 benzene rings or alkyl substituted benzene rings, the total of the alkyl substituents on any di- or trivinylaromatic compound not exceeding 12 carbon atoms. Examples of suitable vinylaromatic compounds for reaction with the organolithium initiator include 1,3-divinylbenzene, 1,3-trivinylnaphthalene, and 4,4'-divinylbiphenyl.

In the preparation of the block copolymers of the invention having more than two polymer segments (a copolymer of the form A-(-D)$_y$, where y=2, 3 or 4, and A and D are as defined previously), those lithium initiators which contain more than one active lithium atom per molecule are suitable. These initiators provide a central polymer segment of the conjugated diene and/or the monovinylarene having attached to each of the terminal ends of the polymer segment an active Li atom. Initiators such as that formed by reacting lithium with methylnaphthalene and isoprene and solubilizing the reaction product with butadiene (LIMI-B) and initiators such as a lithium-stilbene adduct are suitable.

The initiator level for the polymerization can vary widely but is generally in the range of from about 0.1 to about 20 gram millimoles per 100 grams of the total monomer to be polymerized, i.e., all the conjugated diene, monovinylarene, and lactone monomers. The initiator level is generally not changed when the conjugated dienes and monovinylarenes have been polymerized to the desired extent and the lactone or lactones are added for polymerization. Thus, the initiator level for the polymerization of the conjugated diene and monovinylarene is generally the level for the entire polymerization process. Generally, the amount of initiator or initiators used in making the block copolymer of the invention will be that which is sufficient to effect the polymerization of substantially all monomers charged.

For preparing copolymers of lactones and conjugated dienes suitable for modifying unsaturated polyesters, it is preferred to use initiators as described above but in which y is limited to 1 or 2 in order that a linear polymer is the predominant lactone-containing polymer. Such linear, uncoupled polymers form an unsaturated polyester/lactone copolymer/vinyl monomer composition having relatively low viscosity, a factor which can be important in the mixing and fabricating of thermosettable compositions containing rubber-modified unsaturated polyester resins.

Various substances are known to be detrimental to the initiator and the living polymer of the invention. These detrimental substances include carbon dioxide, oxygen and water. It is highly desirable, therefore, that the reactants, the polymerization apparatus, and the polymerization reaction mixture be substantially free of these materials as well as any other materials which can deactivate any reactive species present in the process. Any diluent used should be free of impurities such as water, oxygen and carbon dioxide, and air and moisture should be removed from the polymerization reaction vessel.

The polymerization reaction can be carried out in the presence of a diluent. Suitable diluents include paraffins, cycloparaffins, and aromatic hydrcarbons, each having from 4 to 10 carbon atoms per molecule, and mixtures thereof.

The polymerization temperature for preparation of the A segment (the segment containing polymerized conjugated diene and/or monovinylarene) of the block copolymers is in the range of about 0° C. to about 200° C., preferably 40° C. to about 125° C. The capping agent, if used, can be added at the polymerization temperature used for the A segment. The D segment (that which contains polymerized lactone) is polymerized at temperature of about 20° C. to about 100° C., preferably about 0° C. to 70° C. For convenience, the pressure is maintained at a level sufficient to keep the polymerization reaction mixture substantially in the liquid phase. The time for polymerization of the monomers of each block of segment A can be from about 1 minute to about 100 hours, and the time for polymerization of the monomers of each block of segment D can be from about 1 minute to about 100 hours.

It is important that the combination of polymerization time and temperature for segment D be chosen so that quantitative conversion of monomer to polymer does not occur before the end of the chosen polymerization time. This is important because of the tendency of polylactones, which have a polymer backbone containing ester functional groups, to undergo base-catalyzed degradation. In the presence of base, polylactones or copolymers containing a block of polylactone can undergo random chain scission to yield lactone oligomers or homopolymer. When copolymers of a lactone, a conjugated diene and/or a monovinylarene are prepared by an organolithium-initiated polymerization, base is present throughout the process in the form of the initiator itself or in the form of the living polymer, which may have terminal —CH$_2$—Li or —CH$_2$—O—Li groups. Since the degradation reactions must compete with the polymerization reaction for available lithium and since the polymerization kinetics are favored, degradation does not occur to a large extent until polymerization is complete. Thus, if polymerization is terminated before or immediately following quantitative conversion of lactone monomer to polymer, polylactone degradation (scission) is reduced. However, if termination is accomplished by use of a conventional termination agent such as an alcohol or a mixture of a phenolic antioxidant in an alcohol, the lithium alkoxide or lithium phenoxide which is formed can apparently cause chain scission with the result that the recovered polymer may contain considerable lactone oligomer or homopolylactone and a reduced amount of the desired copolymer containing the lactone incorporated as block polylactone.

If polymerization termination is carried out using water, an aqueous solution of a mineral acid, or a carboxylic acid, the high level of chain scission does not occur. It is currently believed that this may be the result of the fact that lithium hydroxide, a product of termination using water, is soluble in water and is thus isolated from contact with the polymer, which is present in the hydrophobic organic phase, and that the lithium salt which is formed upon termination using a mineral acid or a carboxylic acid has a relatively low basicity.

As the point of quantitative conversion of lactone monomer to polymer cannot be determined by observation of the reaction mixture, this point must generally be determined for a given set of reaction conditions by determination of the percent conversion of all monomers to polymer and analysis of the resulting copolymer to determine the extent of incorporation and retention of the desired amount of lactone in the copolymer for a given lactone reaction time. A convenient method is to determine the extent of lactone incorporation indirectly, that is, by the compatibility of the copolymer with polyester, and to use lactone reaction times which produce copolymers which are most compatibile with polyester. This can be done, for example, by terminating each of a set of identical polymerization mixtures at different times and then using the compatibility of the resulting polymers with polyester in vinyl monomer solution as a test of seccessful incorporation and retention of the desired amount of lactone in the block copolymer.

Polymerization termination is effected by adding water, an aqueous solution of a mineral acid, or a carboxylic acid to the polymerization reaction mixture which, prior to termination contains a polymer of the form A$+$D-Li)$_y$. The mineral acids and lower carboxylic acids are typically added as dilute aqueous solutions, for example as a 0.1 N solution, whereas the higher molecular weight, solid carboxylic acids are typically added without dilution to the polymer cement.

Suitable mineral acids include but are not limited to hydrochloric acid, sulfuric acid and phosphoric acid. The carboxylic acids are the aliphatic, alicyclic, aromatic, and heterocyclic di- and higher acids, and substituted derivatives thereof. Preferred carboxylic acids are the monocarboxylic acids having from about 2 to about 20 carbon atoms per molecule, such as acetic acid, benzoic acid, capric acid, lauric acid, and stearic acid.

Preferably, the amount of acid to be added is such that at least one equivalent weight of acid is added for each equivalent weight of organolithium initiator used to initiate the polymerization. It is within the scope of the invention to add excess acid although the amount added will not normally exceed about 5 equivalents by weight of acid per equivalent of organolithium initiator used.

The termination step can be conducted at the same temperature as the lactone polymerization step. To minimize polylactone block degradation, all polymer lithium should be terminated within the shortest time possible after addition of the terminating agent. For this reason it is desirable that good mixing of the reaction mixture be provided. The terminating agent can be added using any method taught in the art so long as it provides for quick addition of sufficient terminating agent to react with all of the polymer lithium in the polymerization reaction mixture.

Following termination of the polymerization reaction by the method described above, the copolymer can be isolated by conventional techniques such as coagulation with an excess of a non-solvent such as isopropyl alcohol or by steam stripping, followed by drying of the copolymer. Antioxidant can be added to the polymerization mixture after polymerization termination is complete and prior to polymer isolation and drying. Alternately or in addition, the isolated and dried block copolymer can be compounded in any conventional manner with antioxidants as well as other conventional rubber additives such as fillers, reinforcing agents, extenders, plasticizers, pigments, curing and vulcanizing agents, processing aids, retarders, antiozonants, inhibitors, UV stabilizers, dispersing agents, and lubricants.

Among the unsaturated polyesters which are suitable for use in preparing lactone copolymer-polyester compositions are those prepared by reacting an unsaturated dicarboxylic acid having 4 to 12 carbon atoms, such as maleic, fumaric, itaconic, citraconic, mesaconic, cis-2-dodecenedioic acid (or corresponding anhydrides or acid halides of these) and mixtures of these, with one or more polyols. Examples of polyols that can be used include alkylene glycols having 2 to 10 carbon atoms per molecule, dialkylene glycols having 4 to 18 carbon atoms per mole, glycerol, pentaerythritol, trimethylolpropane, trimethylpentanediol, trimethylpropanediol and hydrogenated bisphenol-A.

Up to one half or more on a molar basis of the unsaturated acid can be replaced by one or more saturated polycarboxylic acids having from 2 to 12 carbon atoms per molecule to modify the degree of unsaturation and reactivity of the polyester. Illustrative of these are oxalic acid, malonic acid, succinic acid, methylsuccinic acid, glutaric acid, adipic acid, suberic acid, sebacic acid, phthalic acid, isophthalic acid, terephthalic acid, naphthalene dicarboxylic acid, cyclohexane dicarboxylic acid, tetrabromophthalic acid, chlorendic acid, citric acid and mixtures of these. The appropriate saturated and unsaturated acid anhydrides may be used and are usually preferred when available.

The proportion of polyhydric alcohols having more than two hydroxy groups and the proportion of polycarboxylic acids having more than two carboxy groups is preferably less than about 5 mole percent each based on total amount of polyol and polycarboxylic acid, so that the polyester produced has maximum esterification of the hydroxy and carboxy groups without being too viscous to compound readily.

The lactone copolymer and polyester can be mixed in a solution of a vinyl monomer, to which a catalyst can be added to promote cross-linking among the unsaturated constituents. Suitable vinyl monomers include styrene, vinyltoluene, divinylbenzene, 2-vinylpyridine, diallyl phthalate, triallyl isocyanate, $\alpha$-methylstyrene, alkyl acrylates and alkyl methacrylates in which the alkyl groups have from 1 to about 6 carbon atoms, and mixtures of these. The presently preferred vinyl monomer is styrene because of its availability, reactivity, cost and desirable properties.

The weight ratio of unsaturated polyester to lactone copolymer generally ranges from about 15:1 to about 0.5:1, preferably from about 5:1 to 1:1. Total vinyl monomer from all sources is about 15 to about 300, preferably 30 to 200, parts by weight of vinyl monomer per 100 parts by weight unsaturated polyester plus lactone copolymer.

The composition of the invention can be mixed with other ingredients to give thermosettable compositions suitable for preparing reinforced plastic articles. Ingredients typically included in a thermosettable composition include a catalyst, reinforcing agents, thickeners, and fillers.

Among the suitable catalysts are free radical polymerization initiators selected from organic peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, and t-butyl peroctoate. Alternatively, azo compounds such as azobisisobutyro-nitrile can be used. A presently preferred catalyst is t-butyl perbenzoate. The catalyst is generally used in the range of about 0.1 to 10 parts by weight per 100 parts by weight unsaturated polyester plus lactone copolymer, preferably from about 1 to 5 parts by weight catalyst.

For testing the compatibility of unsaturated polyesters and the lactone copolymers of the invention, the lactone copolymer and the unsaturated polyester can be solution blended using a liquid monomer having at least one ethylenically reactive group per molecule as solvent. Styrene is the generally preferred solvent. The lactone copolymer may be added to a solution of the unsaturated polyester in the liquid monomer, or the unsaturated polyester may be added to a solution of lactone copolymer in the liquid monomer. Alternately and preferably, separate solutions of lactone copolymer and unsaturated polyester, each in a liquid monomer, may be mixed together. The latter method is convenient since the unsaturated polyesters are commercially available in the range of 50 to 75 weight percent solids dissolved in styrene or other liquid monomer. The lactone copolymer/unsaturated polyester/liquid monomer mixture is mechanically stirred at a temperature less than 30° C. and then allowed to stand undisturbed in a capped container at room temperature. Periodic visual examination is made for phase separation

EXAMPLE I

Example I compares the amounts of block polycaprolactone which are successfully incorporated in a styrene-butadiene-epsilon-caprolactone block terpolymer when polymerization is terminated using water, dilute aqueous hydrochloric acid, and a phenolic antioxidant dissolved in alcohol.

A series of terpolymers was prepared according to the general procedure of Table I.

TABLE I

| Step 1 | |
| --- | --- |
| Styrene, parts by weight | 25 |
| Cyclohexane, parts by weight | 780 |
| Tetrahydrofuran, parts by weight | 0.05 |
| n-Butyllithium, mhm[a] | 2.0 |
| Polymerization temperature, °C. | 70 |
| Polymerization time, minutes | 20 |
| Step 2 | |
| 1,3-Butadiene, parts by weight | 35 |
| Polymerization temperature, °C. | 70 |
| Polymerization time, minutes | 60 |
| Step 3 | |
| Propylene oxide, mhm | 5 |
| Reaction temperature, °C. | 70 → 30 |
| Reaction time, minutes | 10 |
| Step 4 | |
| ε-Caprolactone, parts by weight | 40 |
| Polymerization temperature, °C. | 30 |
| Polymerization time, minutes | 10 |
| Step 5 | |

TABLE I-continued

| Termination[b] | variable |
| --- | --- |

[a]mhm = gram millimoles per 100 grams of total monomers added in steps 1, 2, and 4.
[b]See Table II for the terminating agents employed.

Cyclohexane was charged to a 26-oz. beverage bottle equipped with a perforated Crown cap over a self-sealing rubber gasket, and the bottle and cyclohexane were then purged with nitrogen. Styrene and tetrahydrofuran and then the n-butyllithium were added. The temperature was adjusted to 70° C. and the bottle and its contents were tumbled in a constant temperature bath for 20 minutes, after which time the styrene polymerization was essentially complete. 1,3-Butadiene was then charged to the bottle and the polymerization was continued for one hour with continued agitation at 70° C. At the end of this time, polymerization of the butadiene was essentially complete. Propylene oxide was then added to the polymerization reaction mixture and the mixture was agitated for 10 minutes while the temperature was reduced from 70° C. to 30° C. Epsilon-caprolactone was added and polymerization proceeded for 10 minutes with continued agitation. Promptly 10 minutes after the epsilon-caprolactone had been charged, the polymerization reaction was terminated by adding the chosen terminating agent. The reaction mixture and added terminating agent were thoroughly mixed by shaking the beverage bottle to insure quantitative termination of all polymer lithium. One part of 2,6-di-t-butyl-4-methylphenol per hundred parts of total monomer was added as a 10 weight percent solution in 50:50 toluene:isopropanol. The contents of the bottle were emptied into a beaker, and the styrene-butadiene-epsilon-caprolactone block terpolymer was isolated by steam stripping. The recovered polymer was dried at 60° C. for about 15 hours under reduced pressure. Block polycaprolactone was determined for each polymer by an oxidative degradation method as described in Footnote (b) of Table II.

TABLE II

Block Polycaprolactone in Terpolymers as Function of Terminating Agent Employed

| Run No. | Terminating Agent | Total Conv. Of Monomers to Polymer, %[a] | Block Polycaprolactone, %[b] | % of Charged ε-Caprolactone As Block Polycaprolactone |
| --- | --- | --- | --- | --- |
| 1 | A.O. in alcohol[c] | 98 | 2.9 | 7 |
| 2 | A.O. in alcohol[c] | 100 | 2.7 | 7 |
| 3 | Water[d] | 100 | 24.3 | 61 |
| 4 | Water[d] | 100 | 28.5 | 71 |
| 5 | Hydrochloric acid[e] | 100 | 28.1 | 70 |

[a]Weight of recovered polymer as percent of total monomers charged.
[b]Determined by an oxidative degradation procedure wherein about 0.4 g of caprolactone copolymer is dissolved in about 35 ml of o-dichlorobenzene at 100–120° C. in an iodine flask equipped with an air condenser, 10 ml of a 70 weight percent aqueous solution of t-butyl hydroperoxide and 1 ml of 0.004 M osmium tetraoxide in o-dichlorobenzene are added and the mixture maintained at 120 ± 5° C. for 15 minutes. The mixture is cooled to about room temperature and 300 ml of methyl alcohol added to precipitate the residual polymer. The mixture is allowed to stand undisturbed for about 48 hours to insure complete precipitation and is then filtered through a fritted glass filter (medium) with a piece of Whatman No. 25 filter paper placed on top of the fritted glass. The collected precipitate is dried at 100° C. under reduced pressure for about 15 hours, and is then allowed to equilibrate in a dessicator at room temperature for at least one hour before being weighed. Block polycaprolactone content is calculated from the weight of the precipitate and the carbonyl content as determined by infrared spectroscopy of a chloroform solution of the precipitate.
[c]0.4 Grams (1.82 millimoles) of 2,6-di-t-butyl-4-methylphenol (BHT) added in 4 ml. of 50/50 by volume isopropanol/toluene.
[d]10 ml added
[e]10 ml of 0.1 M hydrochloric acid added The data of Table II illustrate that, in the preparation of a styrene-butadiene-epislon-caprolactone block terpolymer, termination of the polymerization reaction with water or dilute aqueous hydrochloric acid results in a terpolymer with a greater block polycaprolactone content than when the polymerization reaction is terminated with the typical antioxidant-alcohol terminating agent. Furthermore, the data for the antioxidant-terminated polymer showing essentially quantitative conversion of monomers to polymer but a low percentage of charged caprolactone as block polycaprolactone suggest that a large proportion of the polymerized caprolactone in these samples is in the form of oligomers and low molecular weight homopolymer resulting from base-catalyzed chain scission, as the low molecular weight of this homopolymer causes it to be undetected as block polycaprolactone.

EXAMPLE II

This example compares the compatibility of styrene-butadiene-epsilon-caprolactone block terpolymers with unsaturated polyesters when the terpolymers are terminated with water, dilute aqueous hydrochloric acid, and a phenolic antioxidant in alcohol solution.

The five terpolymers prepared in Example I were each dissolved in styrene in a 4-oz. bottle (7.5 g terpolymer in 17.5 g styrene) and 25 g of commercial unsaturated polyester resin (Selectron RS 50239, isophthalic acid-based polyester resin comprising 60–65 weight percent solids in styrene, PPG Industries) added to each terpolymer-styrene solution. This mixture was stirred thoroughly at less than about 30° C. to give a terpolymer-unsaturated polyester-styrene solution. The bottle was capped and allowed to stand undisturbed at room temperature. The mixtures were evaluated visually for phase separation every hour for the first 8 hours and then every 24 hours. The compatibility of the terpolymers with unsaturated polyester resin is shown in Table III.

TABLE III

Stability of Terpolymer-Unsaturated Polyester-Styrene Mixture as a Function of Terminating Agent Employed in Terpolymer Preparation

| Terpolymer From Run No.[a] | Terminating Agent[a] | Stability of Mixture,[b] Hours |
|---|---|---|
| 1 | A.O. in alcohol | 1 |
| 2 | A.O. in alcohol | 1 |
| 3 | Water | >92 |
| 4 | Water | >92 |
| 5 | Hydrochloric Acid | >24 |

[a]See Example I, Table II.
[b]Mixture consisting of 15 weight percent terpolymer, 30 weight percent unsaturated polyester, and 55 weight percent styrene.

These data illustrate that terpolymers terminated with water or dilute aqueous hydrochloric acid are more compatible with unsaturated polyester resin than similar terpolymers terminated with antioxidant in alcohol.

I claim:

1. A method of preparing a lactone copolymer which comprises the steps of:
   (a) providing a lithium-terminated polymer of the form A-(-D—Li)$_y$ wherein A is a polymer segment comprising one or more polymer blocks of one or more conjugated dienes and/or monovinylarenes, D is a polymer segment comprising one or more polymer blocks of one or more lactones, and y is 1, 2, 3 or 4, the lithium-terminated polymer being present in a diluent selected from the group consisting of paraffins, cycloparaffins and aromatic hydrocarbons;
   (b) contacting the lithium-terminated polymer with water to form (1) a lactone copolymer of the form A-(-D)$_y$ which is present in an organic phase comprising the lactone copolymer A-(-D)$_y$ and the diluent and (2) a water-soluble lithium hydroxide termination product which is present in a separate phase from the organic phase, the separate phase comprising water and lithium hydroxide; and
   (c) recovering the lactone copolymer of the form A-(-D)$_y$.

2. The method of claim 1 wherein the conjugated dienes are selected from the group consisting of conjugated diene monomers having 4 to 12, inclusive, carbon atoms per molecule, the monovinylarenes are selected from the group consisting of monovinylarene monomers having 8 to 12, inclusive, carbon atoms per molecule, and the lactones are selected from the group of lactone monomers represented by the formula

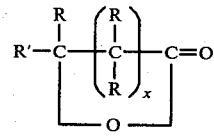

wherein each R is selected independently from the group consisting of hydrogen, alkyl, cycloalkyl, aryl, alkenyl, cycloalkenyl, alkaryl and aralkyl; R' is selected from the group consisting of R, hydrogen and a radical of the formula

and, when R' is the radical

no R is attached to the carbon atom to which the radical is attached; the total number of carbon atoms in all the R and R' substituents does not exceed 12; and x is selected from 1, 3 and 4.

3. The method of claim 2 wherein the lactone is epsilon-caprolactone.

4. The method of claim 2 wherein the cojugated diene is 1,3-butadiene and the monovinylarene is styrene.

5. The method of claim 2 wherein the lithium-terminated polymer A-(-D—Li)$_y$ is formed by contacting a base polymer of the form A-(-Li)$_y$ with one or more lactone monomers in amounts sufficient and under conditions suitable to cause polymerization of the lactone monomers.

6. The method of claim 5 wherein the base polymer of the form A-(-Li)$_y$ is formed by reacting an organolithium initiator of the form R''(Li)$_y$, wherein R'' is a hydrocarbon radical selected from the group consisting of aliphatic, cycloaliphatic and aromatic radicals, with one or more monomers of A in amounts sufficient and under conditions suitable to cause polymerization of the monomers of A.

7. The method of claim 2 wherein A further comprises a residue of a capping agent selected from the group consisting of oxiranes, aldehydes and ketones.

8. The method of claim 7 wherein the capping agent is propylene oxide.

9. The method of claim 7 in which the conjugated diene is 1,3-butadiene, the monovinylarene is styrene, the lactone is epsilon-caprolactone, the organolithium initiator is b-butyllithium, and the capping agent is propylene oxide.

10. The method of claim 2, 4, 6, 8 or 9 in which the lithium-terminated polymer of the form A$(\text{D—Li})_y$ is contacted with water at or before substantially quantitative conversion of the one or more lactone monomers to polymer.

11. The method of claim 10 in which the diluent is cyclohexane.

12. The method of claim 10 in which the polymer of the form A$(\text{D})_y$ contains no more than a minor amount of units of the form $A_n Z(H)_n$, in which Z is the residue of a coupling agent.

13. The method of claim 10 wherein the thus terminated lactone copolymer contains a polymer segment D which cnstitutes at least 24 weight percent of A plus D.

14. The method of claim 10 wherein the thus terminated lactone copolymer contains a polymer segment D which constitutes from about 24 to about 40 weight percent of A plus D.

* * * * *